United States Patent [19]  [11]  4,293,145
Taylor  [45]  Oct. 6, 1981

[54] AUXILIARY LIFT AXLE WHEEL ASSEMBLY

[76] Inventor: Glenn E. Taylor, 1345 Bankhead Ave. NW., Atlanta, Ga. 30318

[21] Appl. No.: 37,326

[22] Filed: May 8, 1979

Related U.S. Application Data

[63] Continuation-in-part of Ser. No. 882,234, Feb. 28, 1978, Pat. No. 4,166,639.

[51] Int. Cl.³ .............................................. B60G 11/56
[52] U.S. Cl. ..................................... 280/704; 267/34; 280/711
[58] Field of Search ............... 280/704, 711, 712, 713, 280/715; 267/34

[56] References Cited

U.S. PATENT DOCUMENTS

| 2,137,662 | 11/1938 | Alvarez | 267/34 |
| 3,285,621 | 11/1966 | Turner | 280/704 |
| 3,499,663 | 3/1970 | Hedlund | 280/704 |
| 3,617,072 | 11/1971 | Turner | 280/704 |
| 3,653,683 | 4/1972 | Hendrickson | 280/713 |
| 3,689,102 | 9/1972 | Granning | 280/704 |
| 3,730,549 | 5/1973 | Turner | 280/704 |
| 3,771,812 | 11/1973 | Pierce | 280/704 |
| 3,870,336 | 3/1975 | Bilas | 280/704 |
| 3,877,718 | 4/1975 | Scanlon | 280/704 |
| 3,904,220 | 9/1975 | Fier | 280/704 |
| 3,966,223 | 6/1976 | Carr | 280/712 |
| 4,000,913 | 1/1977 | Gibson | 280/704 |

OTHER PUBLICATIONS

Neway Air Ride, Specification Form SD-399-2-74.

Primary Examiner—John J. Love
Assistant Examiner—John A. Carroll
Attorney, Agent, or Firm—Jones, Thomas & Askew

[57] ABSTRACT

An auxiliary lift axle wheel assembly is mounted to a vehicle body by L-shaped levers, each of which is pivotally mounted at the intersection of its legs to the vehicle, and the lift axle is held in its upward, unloaded position on the longitudinally extending legs of the levers by the force of springs positioned over the longitudinally extending legs bearing against the upwardly extending legs of the levers. Air inflatable air springs positioned between the auxiliary lift axle and vehicle body are filled with air to move the auxiliary axle downward relative to the vehicle body with force sufficient to overcome the force of the springs to urge the wheels of the axle down into load-bearing engagement with the road surface beneath the vehicle.

10 Claims, 5 Drawing Figures

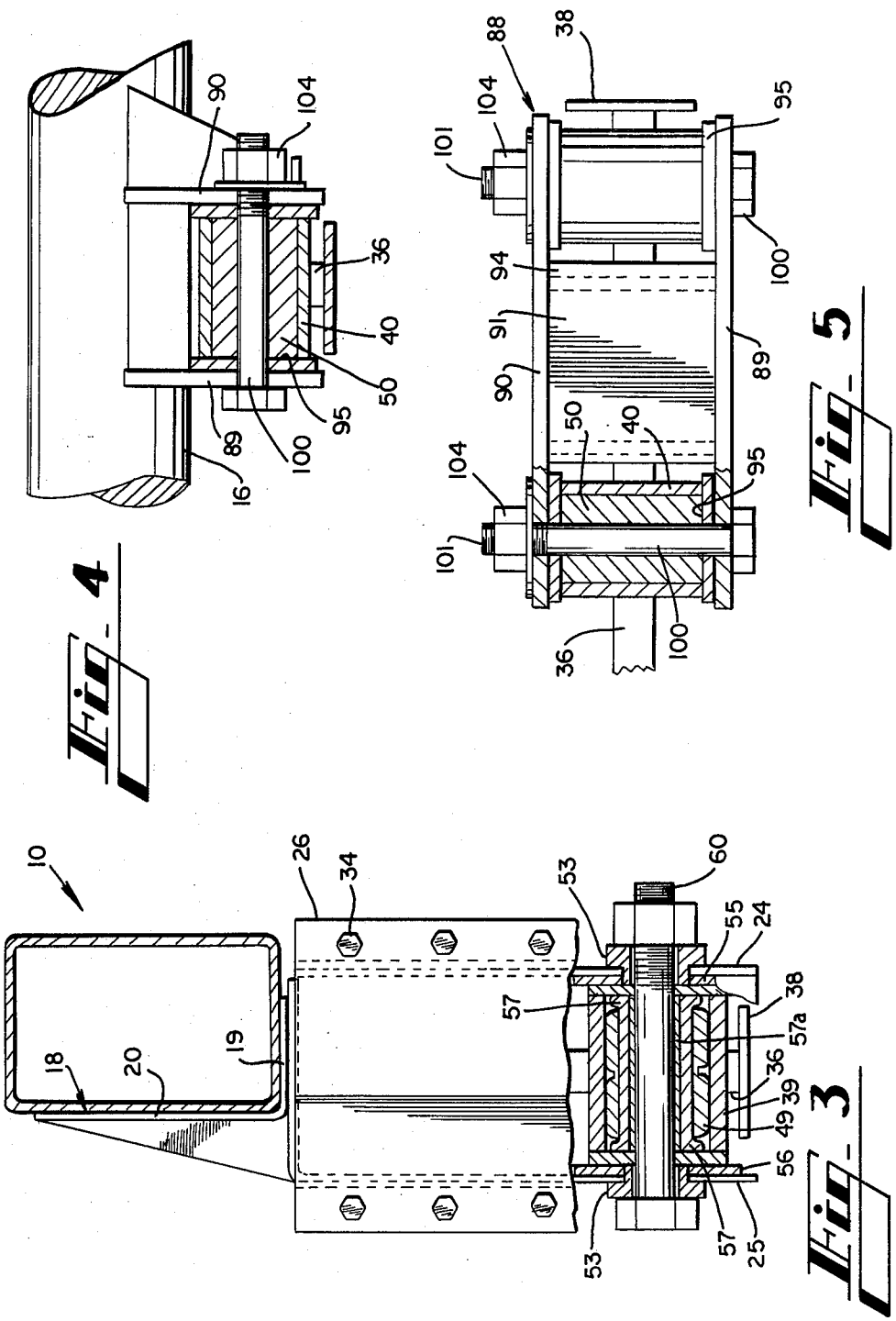

AUXILIARY LIFT AXLE WHEEL ASSEMBLY

CROSS-REFERENCE TO RELATED APPLICATION

This application is a continuation-in-part of U.S. Patent Application Ser. No. 882,234 filed Feb. 28, 1978, now U.S. Pat. No. 4,166,639.

DESCRIPTION

1. Technical Field

This invention relates to auxiliary lift axle wheel assemblies for load carrying vehicles, in which an auxiliary axle and wheel assemblies carried by the vehicle can be moved down toward load-bearing engagement with the road surface when the vehicle is heavily loaded, or can be lifted upwardly away from the road surface when there is little or no load carried by the vehicle.

2. Background of the Invention

Auxiliary lift axle wheel assemblies of various arrangements have been known in the prior art whereby air inflatable bags or "air springs" positioned between the auxiliary axle and vehicle body are used to force the auxiliary axle relative to the vehicle body downwardly into engagement with the road surface to help support the vehicle. In some of the prior art disclosures, such as the types shown in U.S. Pat. Nos. 3,730,549 and 3,966,233, inflatable air bags are positioned directly over the axle, approximately atop the axle. In other prior art disclosures, such as the type shown in U.S. Pat. No. 3,771,812, the auxiliary lift axle is supported at its ends by levers each pivotally mounted to the vehicle at one end, the axle mounted intermediate the ends of the levers, and the inflatable air bags positioned over the other ends of the levers. In both prior art structures, inflating the air bags places a downward force on the auxiliary lift axle, moving it downward relative to the vehicle body toward load bearing engagement with the road surface.

When it is not necessary to use the auxiliary lift axle, it should be returned to its "up" position and held there away from contact with the road surface to avoid unnecessary wear on its wheels. In some of the prior art lift axle wheel assemblies such as the type shown in U.S. Pat. No. 4,000,913 and 3,877,718, leaf springs have been used to lift the auxiliary axle when the air springs are deflated. The leaf spring assembly is connected to the axle with its forces directed upwardly against the air bags, thus holding the axle up until the spring force is overcome by the downward force of the inflating bags.

Coil springs also have been used in some prior art lift axle wheel assemblies to lift the auxiliary axle. For example, U.S. Pat. No. 3,771,812 illustrates a coil tension spring which is expanded by downward motion of the axle. When the downward force exerted by the air bags is removed, the spring contracts and lifts the axle to its up position.

In most of the known prior art lift axle wheel assemblies the springs used to lift the axle have been large and cumbersome and the springs have been expoxed to the dirt and other road contaminants which, in some instances, are deleterious to the spring structure. In some prior art structures the mechanical springs remain under force and are difficult to disassemble when the wheel assembly is being repaired. Also, the vibrations and shocks encountered by the prior art structures tend to damage, sometimes fracture, the lift arms, springs and supporting elements of the structures.

SUMMARY OF THE INVENTION

The present invention involves an auxiliary lift axle wheel assembly for load carrying vehicles. The assembly includes L-shaped levers at each end of a drop axle, with each lever being pivotally mounted at the intersection of its legs to the vehicle and having a leg extending longitudinally with respect to the direction of movement of the vehicle and an upwardly extending leg. The lift axle is mounted at its ends on a saddle and the saddle is mounted on the longitudinal legs of the levers with resilient bushings interconnected between the saddle and the levers. Inflatable air bags or air springs are positioned between the vehicle and the axle and arranged, when inflated, to urge the saddle, levers, axle and wheels downwardly until the wheels are in load-bearing engagement with the road surface beneath the vehicle. Coil compression springs are arranged to bear against the upwardly extending legs of the levers to continuously bias the levers in the direction which lifts the axle and its wheels up away from the road surface. The springs are each enclosed in a housing and are oriented with their line of force oriented approximately longitudinally with respect to the direction of movement of the vehicle and over the longitudinal leg of its lever in a convenient and compact arrangement.

Therefore, it is an object of this invention to provide a lift axle wheel assembly which is compact and simple in its construction, which is convenient and inexpensive to install and to maintain, and which is durable.

These and other objects, features and advantages of the present invention will become apparent from reference to the following description, attached drawings and appended claims.

BRIEF DESCRIPTION OF THE DRAWINGS

FIG. 3 is an end view of the lift assembly of FIGS. 1 and 2, taken along lines 3—3 of FIG. 2.

FIG. 4 is a detail illustration, partly in cross-section, of one of the lift assemblies, taken along lines 4—4 of FIG. 2.

FIG. 5 is a top view of the saddle assembly of one of the lift assemblies, taken along lines 5—5 of FIG. 2.

DETAILED DESCRIPTION

Figure 1:
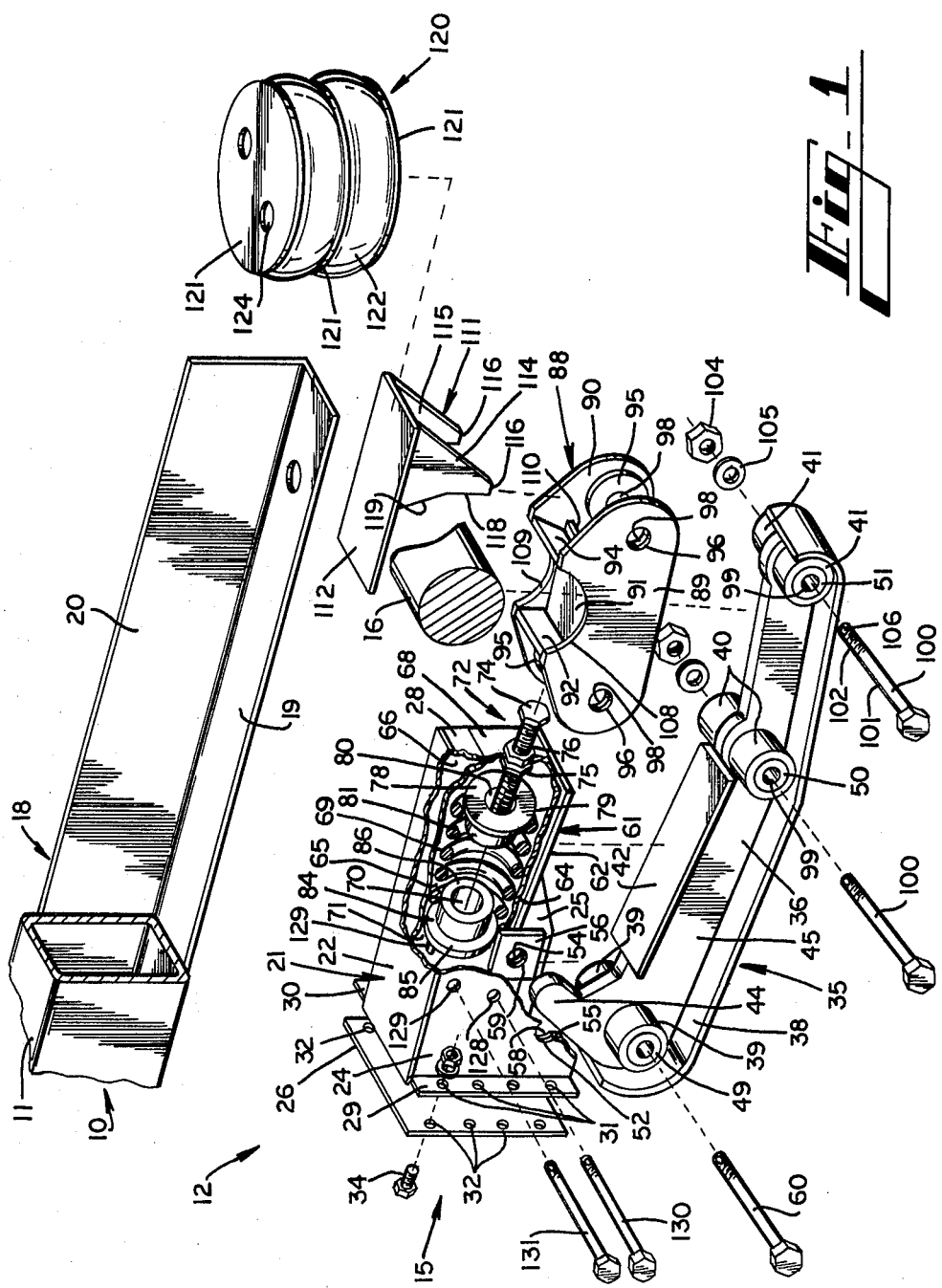
FIG. 1 is an exploded perspective view of one of the lift assemblies for the auxiliary lift axle wheel assembly, showing portions removed from the assembly for clarity.
Figure 2:
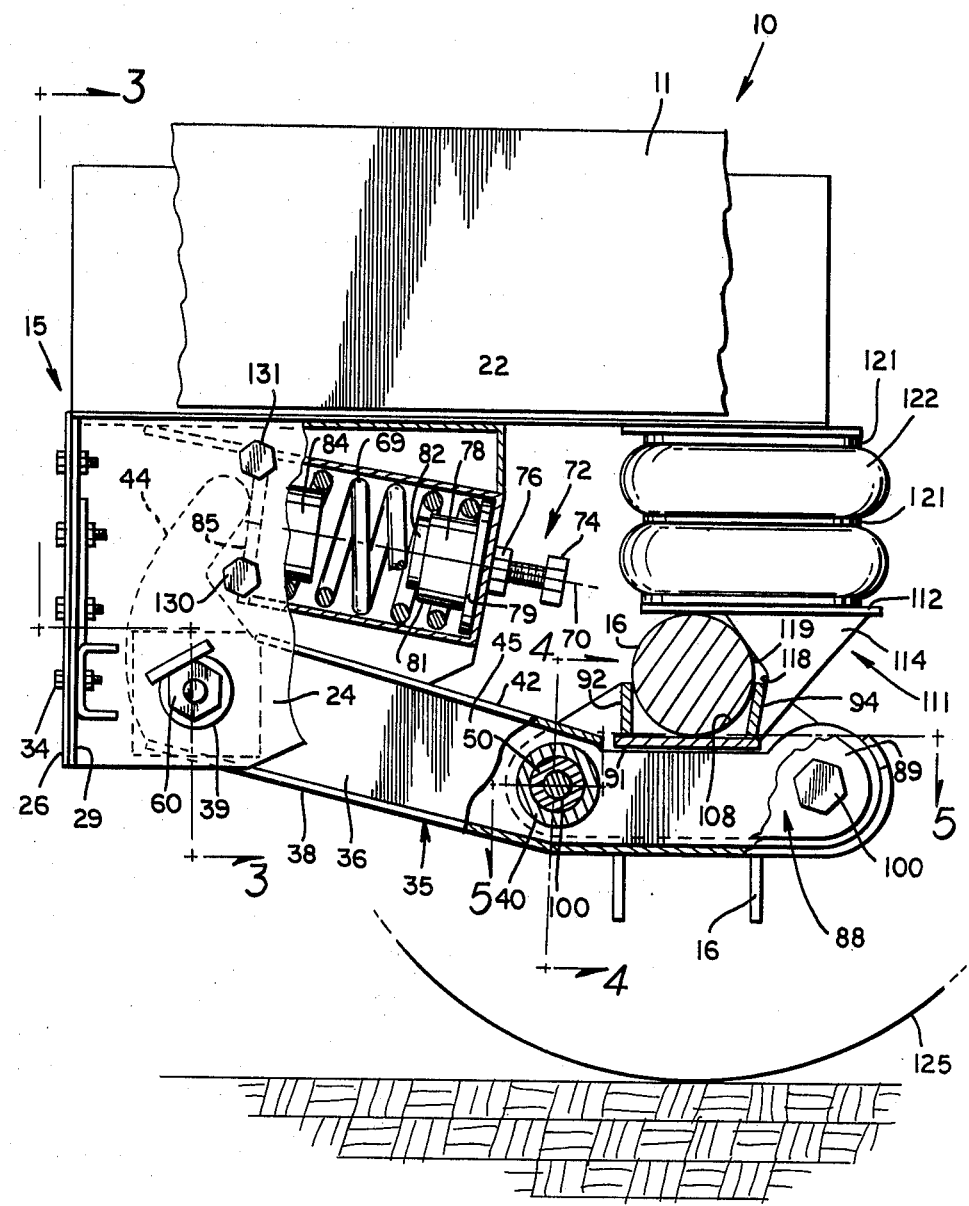
FIG. 2 is a side elevational view of one of the lift assemblies, with portions shown in cross-section.

Referring now in more detail to the drawings, in which like numerals indicate like parts throughout the several views, FIG. 1 illustrates the lower portion of a load-carrying vehicle 10 which includes a vehicle support frame 11. The frame is supported by vehicle wheels (not shown), and the auxiliary lift axle wheel assembly 12 is mounted to support frame 11 of the vehicle.

The auxiliary lift axle wheel assembly comprises a pair of lift assemblies 15 which are to be mounted on opposite sides of the vehicle and which are to support drop axle 16.

Each lift assembly 15 includes a vehicle mounting bracket 18 which is L-shaped in cross-section and includes horizontal plate 19 and vertical plate 20. The mounting bracket is sized and shaped to rest against the rectangular frame element 11 of the vehicle and can be bolted or welded in place. Housing 21 is mounted to the horizontal plate 19 of mounting bracket 18 and comprises top plate 22, side plates 24 and 25, cover plate 26 and end plate 28. The top plate 22 is rigidly affixed to the bottom surface of horizontal plate 19 of mounting bracket 18, as by being welded or bolted thereto. Side plates 24 and 25 each include outwardly projecting vertical flanges 29 and 30 which define spaced openings 31 therethrough, and cover plate 26 is of a height and width sufficient to cover the opening defined at the end of housing 21 and includes openings 32 therein which are sized and spaced in accordance with the size and spacing of openings 31. Bolts 34 are insertable through the openings 31 and 32 to secure cover plate 26 to housing 21. Thus, housing 21 is closed across its top, sides and forward end and is open at its bottom.

Rocker arm or lift lever 35 is mounted in housing 21 and comprises lift strut 36, bottom rocker arm plate 38, bosses or bushing guides 39, 40 and 41 which project from opposite sides of lift strut 36 and top plate 42 mounted on lift strut 36 between bosses 39 and 40. Lift strut 36 is approximately L-shaped in configuration and includes a first upwardly projecting arm 44 and a second horizontally projecting arm 45. As will be pointed out hereinafter, the horizontally projecting arm 45 extends longitudinally with respect to the vehicle and its direction of movement.

Openings are formed in lift strut 36 concentrically with respect to bushing guides 39, 40 and 41, and bushings 49, 50 and 51 extend through bushing guides 39, 40 and 41, respectively in alignment with the openings. Bushing guides 49, 50 and 51 are formed from resilient material such as hard rubber. Openings 52 and 54 are formed in side plates 24 and 25, and reinforcement plates 55 and 56 are rigidly mounted to the inside surfaces of side plates 24 and 25 and define openings 58 and 59 which are concentric with openings 52 and 54. The distance between the adjacent surfaces of reinforcement plates 55 and 56 corresponds to the distance between the outside surfaces of bushing guides 39 of lift lever 35, and lift lever 35 is mounted between side plates 24 and 25 so that the openings through its bushing 49 are in alignment with the openings 52, 54, 58 and 59, and a pivot pin 60 extends through the aligned openings so that the lift lever 35 is pivotally mounted in housing 21 at the intersection of its vertically and longitudinally projecting arms 44 and 45. Vertically projecting arm 44 projects upwardly into housing 21 while longitudinally projecting arm 45 projects beneath housing 21 and beneath vehicle mounting bracket 18.

As illustrated in FIG. 3, the bushing assembly at the intersection of the vertical arm 44 with the longitudinally extending arm 45 of the lift lever 35 also includes flanged end caps 53 which project through side plates 24 and 25 and through reinforcement plates 55 and 56 and end caps 57 which project inwardly of the resilient bushing 49, and internal sleeve 57a which surrounds pivot pin 60.

Spring housing 61 is positioned in housing 21 and includes bottom plate 62, side plates 64 and 65, top plate 66 and end plate 68. Spring housing 61 is rigidly mounted in housing 21 as by welding or bolting therein. Coil compression spring 69 is located inside spring housing 61 with its longitudinal line of force 70 extending along the length of spring housing 61. Since the spring housing 61 is angled upwardly from its end plate 68 toward its open end 71, the line of force 70 of the spring 69 is angled upwardly within housing 21 toward front cover plate 26.

Spring adjuster assembly 72 is mounted in end plate 68 of spring housing 61 and includes externally threaded screw 74 which extends through a central opening in the end plate 68, through a pair of nuts 75 and 76 and into spring cap 78. Nut 75 is welded to the inside surface of end plate 68 while nut 76 is rotatable with respect to the end plate 68 and screw 74 to function as a lock nut. Spring cap 78 comprises annular end plate 79 which defines a central opening 80 through which screw 74 projects, cylindrical guide 81 is fixed at one of its ends to annular end plate 79 and cap plate 82 affixed to the other end of cylindrical guide 81. Coil compression spring 69 bears against annular end plate 79 while the end (not shown) of screw 74 bears against cap plate 82. When screw 74 is rotated through nut 75 to move further inwardly with respect to spring housing 61 or to be withdrawn from the spring housing, the spring cap 78 moves within spring housing 61 to apply more force to or to relieve force from coil compression spring 69. Spring bearing plate assembly 84 is located in the other end of spring housing 61 and includes bearing plate 85 and cylindrical guide 86. One end of coil compression spring 69 bears against one surface of bearing plate 85, while the other surface of bearing plate 85 bears against the vertically projecting arm 44 of lift lever 35.

Saddle assembly 88 is mounted on the distal end of lift lever 35 and includes a pair of spaced parallel saddle plates 89 and 90, horizontal reinforcing plate 91, angled reinforcing plates 92 and 94 and annular spacer plates 95. Openings 96 are formed in saddle plates 89 and 90, and the openings 98 of the annular spacer plates 95 are identical in size and are aligned with the openings 96. The annular spacer plates 95 are rigidly mounted to the inside surfaces of saddle plates 89 and 90, and the distances between the facing surfaces of the annular spacer plates 95 correspond to the distance between the outside or end surfaces of the bushing guides 50 and 51, so that the saddle assembly 88 slips down onto the distal end of lift lever 35, with the openings 96 and 98 of the saddle assembly in alignment with the openings 99 through bushings 50 and 51. Bolts 100 comprise cap screws 101 having external threads 102 at their ends, nuts 104 and washers 105. The screws 101 are inserted through the aligned openings 96, 98 and 99 and the washers 105 and nuts 104 are inserted about the protruding ends of the screws and threaded onto the exposed threads 102. A cotter pin can be inserted through an opening 106 at the distal end of the screws 101 to assure that the nuts 104 are not lost from the screws. Since the bushings 50 and 51 are fabricated from resilient material such as rubber, the saddle assembly 88 is resiliently and firmly held on a distal end of lift lever 35.

Saddle plates 89 and 90 each define an arcuate recess 108 and 109 in its upper surface, with the recesses being aligned with each other. The horizontal reinforcing plate 91 is positioned immediately beneath the recesses 108 and 109 while the angled reinforcing plates 92 and 94 are positioned on opposite sides of and are angled inwardly toward recesses 108 and 109. The reinforcing plates are fixedly attached to each other and to saddle plates 89 and 90 by weldments. The recesses 108 and 109 correspond in radius to the radius of axle 16, and axle 16 is received in the recesses. The axle can be attached to the saddle plates by weldments, if desired. The horizontal reinforcing plate 91 projects beneath angled reinforcing plate 94 to form a protrusion or ledge 110 behind angled reinforcing plate 94.

Air bag platform 111 if fixedly attached to saddle assembly 88 and includes air bag support plate 112 and downwardly extending side plates 114 and 115. The bottom edge 16 of each of the side plates is angled so that it rests flat against the upper surface of ledge 110, while the surfaces 118 of the side plates that face angle reinforcing plate 94 are angled so that they abut the surface of angled reinforcing plate 94, and the surface 119 of the side plates are angled so as to extend about and in abutment with axle 16. The air bag platform 111 is rigidly attached to saddle assembly 88 by welding, etc.

Air bag or bellows assembly 120 is mounted on top of air bag platform 111, between the platform 111 and the bottom surface of horizontal plate 19 of vehicle mounting bracket 18. Air bag 120 comprises two or more rigid metal plates 121 and intermediate flexible air impermeable material 122. The air bag 120 is expandable and contractable by the introduction of air into and the exhaustion of air from the air bag assembly through openigs 124 and plates 121.

When the auxiliary lift axle wheel assembly 12 is assembled and mounted on a vehicle, a pair of lift assemblies 15 will be located on opposite sides of the vehicle with the vehicle mounting brackets 18 attached to the frame of the vehicle. This will locate the wheels 125 on opposite sides of the vehicle and in alignment with the direction of movement of the vehicle. The coil compression spring 69 will be in engagement with the vertically projecting arm 44 of the lift lever 35, and the spring force lifts the wheels 125 away from engagement with the ground surface. When the air bag assembly 120 is inflated, the air bag urges the air bag platform 111 downwardly away from the vehicle mounting bracket 18, causing the axle 16 and wheels 125 to move downwardly toward engagement with the ground surface. This causes the lift lever 35 to pivot in housing 21, and the vertically projecting arm 44 moves against the spring bearing plate assembly 84, forcing spring 69 to contract. When it is desired to lift the wheels 125 upwardly away from the ground surface, the air in bellows assemblies 120 is allowed to escape to the atmosphere, which permits the bellows to be contracted. The forces from coil compression springs 69 are sufficient to overcome the weight of the wheels 125, axle 16 and the other related elements, so as to pivot the lift lever 35 in housing 21, causing the wheels 125 to be lifted or retracted away from the ground surface.

The saddle assembly of each lift assembly 15 is resiliently mounted upon the lift lever 35 so that the shocks encountered by the wheels 125 will be dampened as they are transmitted from the axle 16 to the lift lever 35 and its related equipment, thereby prolonging the life of the lift lever.

Side plates 24 and 25 of housing 21 each define openings 128 and 129 which are aligned with one another, and retaining pins 130 and 131 are insertable through the aligned openings. The openings and pins extend across the path of movement of the spring bearing plate assembly 84, so that when the lift lever 35 has been moved to its down position under the influence of air bag assembly 120, and spring bearing plate assembly 84 has been moved against the bias of spring 69, the pins 130 and 131 can be inserted through the openings 128 and 129. When the bellows assembly 120 is allowed to contract, the spring 69 will push spring bearing plate assembly 84 into engagement with pins 130 and 131, and the spring will be maintained in spring housing 61 by pins 130 and 131. This permits lift lever 35 to be removed from the assembly without having to remove spring 69.

While this invention has been described in detail with particular reference to preferred embodiments thereof, it will be understood that variations and modifications can be effected within the spirit and scope of the invention as described hereinbefore and as defined in the appended claims.

I claim:

1. A lift axle wheel assembly for a wheeled vehicle comprising: an axle for placement transversely beneath the vehicle, housings for mounting to the frame of the vehicle at each end of said axle, an approximately L-shaped lever in each housing pivotally mounted at the intersection of its legs in each housing about an approximately horizontal axis and pivotally mounted at the intersection of its legs in each housing about an approximately horizontal axis and pivotable in an approximately vertical plane with one leg of said lever extending in an upward direction and the other leg of said lever extending longitudinally with respect to the vehicle, a saddle assembly mounted on the longitudinally extending leg of each lever, resilient bushings connecting the saddle assembly to its longitudinally extending leg of a lever, said axle being mounted at its ends on the saddle assembly of the longitudinally extending leg of each lever, an inflatable pneumatic chamber mounted at each end of said axle for bearing between the frame of the vehicle and said saddles and, upon inflation, urging said axle downwardly with respect to the vehicle, and coil compression spring means mounted in each of said housings over and approximately parallel to the longitudinally extending leg of the lever in the housing with each spring means in engagement with the upwardly extending leg of the lever and arranged to urge the longitudinal leg of the lever upwardly against the force of the inflatable pneumatic chambers.

2. The lift axle wheel assembly of claim 1 and wherein said spring means comprise a coil compression spring in each housing with each spring means arranged to apply its forces approximately longitudinally with respect to the vehicle.

3. The lift axle wheel assembly of claim 1 and wherein said axle comprises a drop axle including end portions for mounting wheels thereon and a central portion which is lower than said end portions.

4. The lift axle wheel assembly of claim 1 and wherein said housings each define openings therein in alignment with the end of its said spring means whereby retaining pins or the like are insertable into the housing from outside the housing for holding the spring in the housing when the axle and L-shaped lever arms are removed from the vehicle.

5. An auxiliary axle assembly for a wheeled vehicle comprising an axle for mounting transversely beneath the vehicle, wheels mounted on each end of said axle, a mounting frame at each end of said axle for mounting to the vehicle, an approximately L-shaped lever at each end of said axle with each lever including a first extension extending approximately longitudinally with respect to the vehicle, a saddle assembly mounted on the first extension of each lever, resilient bushing means connecting each saddle to its first extension, said axle being mounted on said saddle assembly, said first extension being pivotally mounted at one of its ends to said mounting frame, an air inflatable bag assembly positioned at each end of said axle and positioned on one of said saddle assemblies and arranged to bear between said mounting frame and said axle to urge said axle downwardly with respect to said mounting frame, a spring housing mounted on each mounting frame, each said lever including a second upwardly projecting extension, spring means positioned in each spring housing over the first extension of said lever, each said spring housing including a rear wall, side walls and a movable bearing plate opposite said rear wall, said bearing plate being movable relative to said rear wall in a path perpendicular to the plane of said rear wall, each said spring means having one of its ends braced against said rear wall of said housing and having its other end bearing against said movable bearing plate, each upwardly projecting lever extension contacting said movable bearing plate, whereby downward movement of said axle resulting from expansion of the air bags forces each upwardly projecting lever extension against its movable bearing plate and causes the spring means to contract, and said spring means urges said axle upwardly against said air bags.

6. Auxiliary axle assembly of claim 5 and wherein said spring housings each include openings therein adjacent the upwardly extending projections of said levers for receiving retaining pins to hold the spring means in said housing when the lever is removed from the vehicle.

7. A lift axle wheel assembly for a wheeled vehicle comprising: an axle for placement tranversely beneath the vehicle, wheels mounted on each end of said axle, and at each end of said axle a mounting bracket for mounting said wheel assembly to a wheeled vehicle, a housing mounted on said mounting bracket, an L-shaped lever pivotally mounted at the intersection of its legs to said housing, with each L-shaped lever having one leg extending in an upward direction and its other leg extending longitudinally with respect to the direction of travel of said wheel assembly, a saddle resiliently mounted on the longitudinally extending leg of said L-shaped lever, an inflatable pneumatic chamber mounted between said saddle and said mounting bracket, and a coil compression spring mounted in said housing over the longitudinally extending leg of said L-shaped lever and biased against the upwardly extending leg of said lever and arranged to urge the L-shaped lever against said inflatable pneumatic chamber, and said axle being mounted at its ends to the saddle mounted on the longitudinally extending ends of said L-shaped levers, whereby the springs tend to pivot said L-shaped levers in one direction to lift and hold the wheels of the axle upwardly away from engagement with the road surface and the inflation of the pneumatic chambers tends to pivot said L-shaped levers in the opposite direction to lower and hold the wheels of the axle down in engagement with the road surface.

8. The lift axle wheel assembly of claim 7 and wherein each of said housings includes receptacles for receiving and holding pin members in the path of movement of the spring in said housing, whereby when pin members are inserted into the receptacles the lever arms can be removed from the lift axle wheel assembly and the springs are retained in said housing.

9. A lift axle wheel assembly comprising an axle, and at each end of said axle a wheel for engaging the ground surface, a housing for connection to the frame of a vehicle, an approximately L-shaped lift lever pivotally mounted at the intersection of its arms to said housing about an axis approximately parallel to the axis of rotation of said wheel, said L-shaped lift lever including an upwardly extending arm and an arm extending longitudinally with respect to the direction of travel of said wheel, a saddle assembly mounted on the longitudinally extending arm of said lift lever, resilient connection means connecting said saddle assembly to said lift lever, said axle being mounted at one of its ends to said saddle assembly, a pneumatically inflatable means mounted on said saddle assembly and bearing against said housing to urge said lift lever in a first pivotal direction with respect to said housing to move the wheel downwardly toward the ground surface, and spring means mounted in said housing and positioned over the longitudinally extending arm of said lift lever and having one end portion thereof resiliently bearing against the upwardly extending arm of said lift lever to urge said lift lever in a second pivotal direction with respect to said housing to move the wheel upwardly away from the ground surface.

10. The lift axle wheel assembly of claim 9 and wherein said saddle assembly comprises a pair of spaced parallel saddle plates each defining a recess for receiving said axle and aligned openings therethrough, and wherein said longitudinally extending arm of said L-shaped lift lever includes openings therethrough which are sized and spaced to correspond to the sizes and shapes of the openings of said saddle plates, and connector pins for insertion through the openings of the saddle plates and the L-shaped lift lever to mount said saddle assembly on said lift lever.

* * * * *